John T. Dewan
INVENTOR.

BY Donald H. Fidler
ATTORNEY

United States Patent Office 3,292,146
Patented Dec. 13, 1966

3,292,146
METHOD AND APPARATUS FOR ACOUSTIC LOGGING IN CASED WELL BORES
John T. Dewan, Houston, Tex., assignor to Schlumberger Well Surveying Corporation, Houston, Tex., a corporation of Texas
Continuation of application Ser. No. 130,069, Aug. 8, 1961. This application May 26, 1964, Ser. No. 370,763
7 Claims. (Cl. 340—18)

This application is a continuation of application Serial No. 130,069, filed August 8, 1961, now abandoned.

The present invention relates to acoustic logging apparatus for use in well bores and, more particularly, to acoustic apparatus for investigating the nature of acoustic coupling between a casing and materials disposed to the exterior of the casing.

In a typical well completion operation, a casing is positioned in the borehole and cement is pumped into the annulus defined between the casing and borehole. For various reasons, the cement may fail to completely fill the annulus along the length of the casing, which often results in a condition generally known as "channeling." Moreover, part or portions of the column of cement may fail to bond to the casing or formations. In such instances, fluids and/or gases from formations at other depths may migrate along the imperfections in the column of cement. Thus, if a production sand is completed as by perforation in a zone which includes such imperfections, migrating fluids and/or gases from other earth formations may impair the production of hydrocarbons from the sand.

In another typical instance of recovery operations for a "stuck" drill pipe, casing or the like it is important to know where the pipe is embedded by the earth formations. In many instances the packing of earth formations about the pipe is analogous to the conditions of a cement bonded pipe in that an acoustic signal is greatly attenuated at the "stuck" point.

By means of the present invention in the above instances, the acoustic coupling of materials to the pipe string in the borehole, either cement bonded to casing or the earth formations packing about the casing, is measured to provide a desired indication of the degree of the bond.

Accordingly, it is an object of the present invention to provide new and improved methods of determining in a cased well bore the acoustic coupling of materials to the casing.

A still further object of the present invention is to provide new and improved apparatus for determining by acoustic techniques, the quality of a cement bond between a column of cement and a casing in a well bore.

Yet another object of the present invention is to provide new and improved means for locating imperfections in the bonding of cement column to a casing in a well bore.

In the systems embodying the present invention, a selected portion of a pulse of acoustic energy travelling a fixed distance through a casing in a well bore is measured and successive measurements taken along the casing are plotted as a function of depth. The selected portion of the acoustic pulse is measured in a preselected time interval and at a preselected time to obtain indications of the acoustical coupling of materials to the casing. More particularly, an apparatus is provided with a transmitter which is periodically pulsed to generate pulses of acoustic energy for transmission through the various adjacent media or materials to a receiver which is spaced a fixed distance from the transmitter. The receiver is responsive to the emitted acoustic energy to develop corresponding electrical signals which typically consist of a series of alternations having a characteristic first cycle with a first peak of small amplitude and a given polarity relative to a reference value, followed by a second peak of considerably larger amplitude peak with an opposite polarity and about three times the amplitude of the first peak. Subsequent cycles of the electrical signal generally have peak amplitudes which are relatively much larger than either the first or second peaks. It has been found that the earliest arriving cycles of the acoustic energy are more diagnostic for this purpose than later arriving cycles. Alsos it has been found that the amplitude of a given half-cycle of an early arrival of acoustic energy which passes through a casing in a given time has a general relationship to the quality of bonding to the casing, the amplitude decreasing as the quality of cementation increases. These observations also apply in a general manner to instances where the formations are tightly packed about a casing in which case the acoustic energy passing through the casing is very greatly attenuated and the amplitude of the electrical signal is decidedly decreased relative to an amplitude that one would expect. These observations, when implemented by a plot of amplitude values relative to depth, provide a remarkable indication of the quality of cementation along a length of pipe. In accordance with the above observations, the apparatus further includes an output circuit coupled to the receiver via a gated amplitude circuit where the gated amplitude circuit is operated at a selected predetermined time for a predetermined time interval to provide an amplitude signal to the signal output circuit which is representative of the amplitude of the signal from the receiver occurring at the selected predetermined time and during the predetermined time interval. The predetermined times are selected to measure a half-cycle of the signal most representative of the quality of the bond of the materials to the casing which is preferably the second peak of the first cycle of the signal. Hence, the predetermined time interval is dependent upon the period of a half-cycle of the signal; and the selected predetermined time is dependent upon the spacing between the transmitter and receiver, the standoff of the apparatus from the casing and the velocities of the well bore fluid and casing.

The novel features of the present invention are set forth with particularity in the appended claims. The present invention, both as its organization and manner of operation together with further objects and advantages thereof, may best be understood by way of illustration and example of certain embodiments when taken in conjunction with the accompanying drawings in which:

Figure 1:
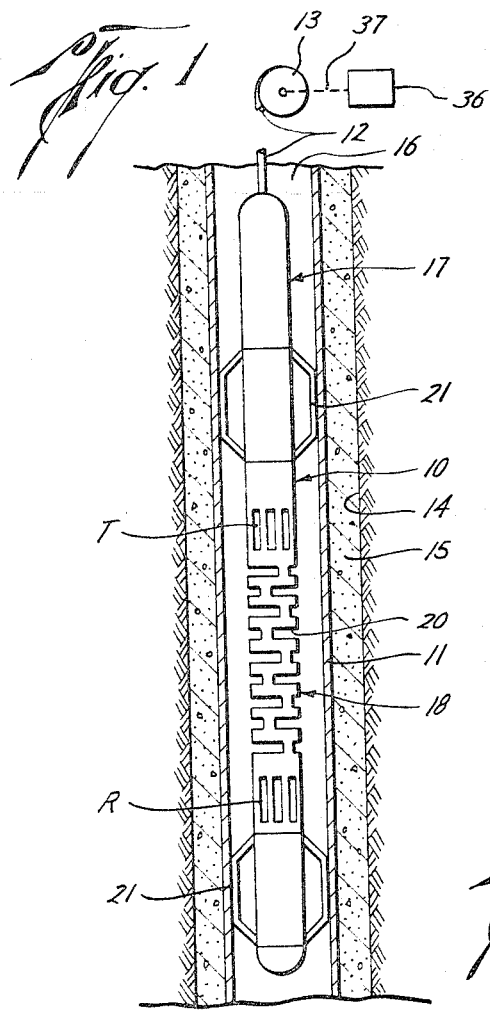
FIG. 1 is a schematic view of apparatus embodying the present invention disposed in a well bore.

Referring now to FIG. 1, apparatus indicated generally by the numeral 10 which embodies the present invention is suspended in a casing 11 by means of a cable 12 and a winch 13 which are located at the earth's surface. The cable and winch serve to lower and raise the apparatus 10 through the casing in a conventional manner. Casing 11 is disposed in a bore hole 14 and suitably cemented thereto by a column or body of cement 15. Casing 11 also is filled with a fluid 16 such as water or a drilling mud.

Apparatus 10 generally includes an upper, fluid tight section 17 containing the electrical components of the apparatus and a lower section 18 containing longitudinally spaced transducers which may be a conventional magnetostrictive transmitter T and receiver R.

The transmitter T and receiver R are spaced a fixed distance from one another and acoustically isolated from one another by any suitable arrangement having a characteristic low acoustic velocity or a high acoustic impedance so that acoustic energy first arriving at the receiver R is that which travels through the adjacent higher velocity media and not the acoustic energy travelling through the spacing arrangement or fluid in the casing. As shown in FIG. 1, the spacing arrangement is shown to include a housing 20 with apertures disposed along the length of the housing and angularly disposed relative to one another. The tortuous configuration of the housing has been found to increase the time required for acoustic energy to travel along its length. In general operation, as the apparatus 10 is passed through the casing, the transmitter T is periodically energized by a sharp pulse of electrical energy to produce a sharp pulse of acoustic energy. The significant acoustic energy under consideration herein travels through the fluid to the casing and subsequently returns through the fluid to the receiver. If the cement column is bonded to the casing, the amplitude of the acoustic energy is dissipated by the acoustic loading of the cement column on the casing. However, in the absence of cement bonding to the casing, the acoustic energy has relatively little change in its amplitude.

The apparatus 10 is centered in the casing by suitable centralizing means such as rubber constructed devices 21 disposed above and below the acoustic section 18 which insure a geometrically uniform propagation of acoustic energy to the walls of the casing and assist in obtaining a characteristically reliable electrical signal at the receiver.

A source of alternating current (not shown), for example, 60 cycles A.C., at the earth's surface can be coupled via the cable 12 to a conventional power supply (not shown) in the apparatus 10 to supply the operating potentials for the various electrical components of the apparatus.

Figure 2:
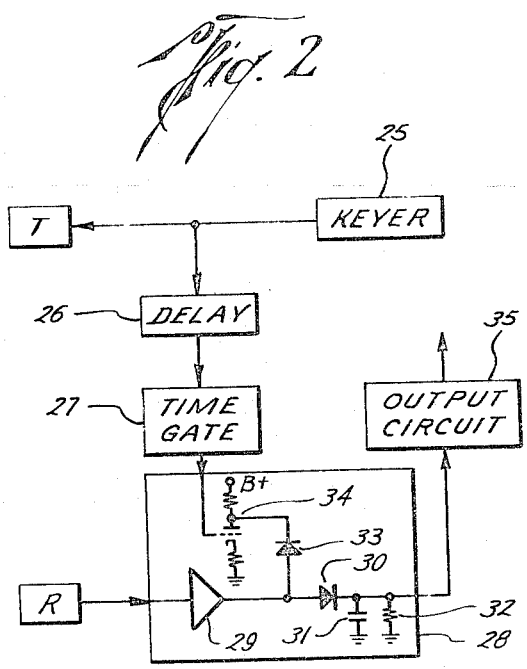
FIG. 2 is a schematic representation of circuitry embodied in the present invention.

The electrical circuitry for the apparatus 10 as shown in FIG. 2 includes a keyer circuit 25 coupled to the transmitter to repetitively actuate the transmitter to develop pressure pulses in the well fluid. The keyer circuit 25 also supplies a trigger pulse to a conventional delay circuit 26 which circuit, after a selected predetermined time, actuates a time gate circuit 27. The time gate circuit 27 which may typically be a conventional monostable multivibrator, when actuated, provides a control pulse for a predetermined time interval which control pulse conditions a gated amplitude circuit 28 for operation during such predetermined time interval.

The receiver R is coupled to the amplitude circuit 28 so that the portion of the electrical signal generated by the receiver R in response to acoustic energy arriving at the receiver during the predetermined time interval is passed to the circuit 28. Circuit 28 is arranged to develop an output signal representative of the amplitude of the portion of the electrical signal occurring during the predetermined time interval. The output signal from circuit 28 is, in turn, coupled to an output circuit 35 for transmittal to the surface via cable 12 to surface indicating means 36 (FIG. 1) such as a recorder.

Circuit 28 as briefly shown in FIG. 2 may include an amplifier 29 with its output connection coupled via a diode 30 to a capacitor 31 and a resistance 32 coupled in parallel. The output connection of the amplifier 29 is also connected via a diode 33 to an electrical switch 34. For example, switch 34 may have its plate connected to diode 33 and may be operated as a switch by application to its grid of a control pulse from gate 27. When the electrical switch 34 is actuated by a control pulse, the signal from the amplifier 29 is passed via the diode 30 to the condenser 31 which charges rapidly to the peak voltage. Output circuit 35 may be a conventional cathode follower circuit.

The recorder 36 at the earth's surface is mechanically driven in a well-known manner by a drive connection (indicated by the dashed line 37) to the winch 13 so as to be responsive to travel of the cable and so that the output signals of the output circuit 35 are recorded against a depth base as the apparatus 10 is passed along the casing.

Figure 3:
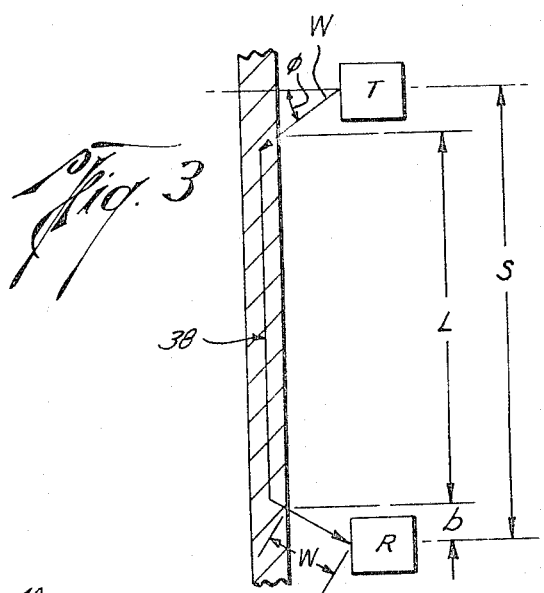
FIG. 3 is a schematic representation of the passage of sound energy between acoustic transducers.

By way of illustration, the following example will serve to clarify the timing relationship of the control pulse of gate circuit 27, relative to the expected first arrival of acoustic energy. The shortest time in which acoustic energy can travel from the transmitter to the receiver is shown by schematic path 38 in FIG. 3. The time required for energy to travel from the transmitter to the casing may be determined from the ray or arrow W which is at an angle $\phi$ relative to an horizontal plane through the casing. The angle $\phi$ can be calculated as follows:

$$\sin \phi = \frac{V \text{ fluid}}{V \text{ casing}} \quad (1)$$

where V fluid is equal to the acoustic velocity of the fluid in the casing and V casing is equal to the acoustic velocity of the casing. For example, if the fluid is water which has a characteristic velocity of 5000 feet per second and the casing is steel which has a characteristic velocity of 17,500 feet per second, the angle $\phi$ will be equal to 16° 20′. If the transmitter T and receiver R are magnetostrictive devices, for example, they may have a given diameter of, say, 3 inches. Thus, in a 7-inch casing, for example, the spacing $a$ between the apparatus and casing will be 2 inches. Hence, knowing the spacing $a$ and angle $\phi$, the length of ray W may be calculated and, of course, the length or distance W divided by the velocity of the fluid will give the shortest travel time $t_w$ through the fluid.

With the spacing $a$, the length of path W, and angle $\phi$ known, the distance $b$ between the receiver and the horizontal plane intersecting the entry point of ray W with the casing is easily calculated. Hence, with a given span S between the transmitter and receiver, the shortest time $t_c$ through the casing is equal to:

$$t_c = \frac{S - 2b}{V \text{ casing}} \quad (2)$$

The shortest total time ($t_{total}$) is then equal to:

$$t_{total} = t_c + 2t_w \quad (3)$$

From the foregoing, it will be appreciated that the shortest total time required for an acoustic signal to pass through unbonded casing of a given diameter may be calculated. Thus, the delay circuit 26 can be provided with a preselected time delay so that time gate circuit 27 is actuated at a preselected time.

Figure 4:
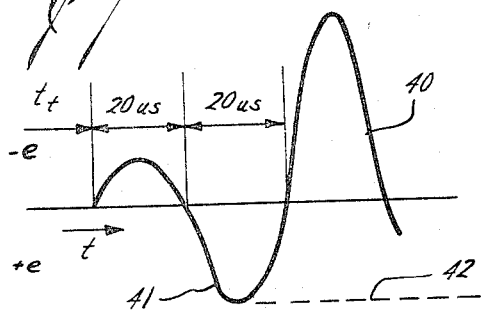
FIG. 4 is a typical illustration of signals of the apparatus of FIG. 2 against a time base.

In a typical operation of the above-described apparatus, as the apparatus 10 is passed through the bore hole, repetitive acoustic pulses are produced by transmitter T and travel through various paths to the receiver R. The receiver develops an electrical signal which has a typical wavelet form 40 as shown in FIG. 4. In accordance with the above teachings, the shortest total travel time ($t_t$) for acoustic energy to travel between transmitter T and receiver R may be calculated. If the frequency of the acoustic pulse is, say 25 kilocycles, then the period of one cycle of the electrical signal will be about 40 microseconds. Hence, the delay circuit may be set to operatively condition the time gate 27 for operation after a preselected time equal to $t_t + 20$ microseconds (FIG. 4) following the acoustic pulse generated by the transmitter T. The time gate 27 functions to condition the amplitude gate 28 for 15 microseconds so that the second peak 41 of the electrical signal 40 is passed to the output circuit 35 which develops an output signal 42 similar in form to that shown in dashed line in FIG. 4. The output signal 42 is passed to the surface recorder 31 via the cable 12. If the cement is bonded to the casing, the amplitude of the electrical signal (indicated by dashed line 42) is relatively small as compared to the amplitude of the electrical signal when the casing is unbonded. By comparison of the amplitude readings, the relative quality of the cement bond, i.e. good, poor, doubtful, etc. can be ascertained.

Although the foregoing discussion has been in relation to casing which is acoustically coupled to a bore hole by a column of cement, it should be apparent that the present invention is also applicable for "free point" indications where a casing is "stuck" in a bore by mud, debris or formations packed about the casing, as this will produce a similar relative attenuation of the transmitted acoustic energy.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

I claim:

1. Acoustic well logging apparatus for use in a cased well bore comprising: an elongated support member adapted to be spaced a given distance from the walls of a well bore, acoustic transmitter means and acoustic receiver means supported along the length of said support member in a fixed relationship relative to said support member, said transmitter being arranged to provide an acoustic impulse which is transmitted at least in part along the casing in said well bore, said receiver means being responsive to an acoustic impulse transmitted along said casing for developing a corresponding electrical signal characteristically consisting of a series of alternations, gated amplitude circuit means coupled to said receiver means for developing an output signal with a magnitude proportional to the amplitude of a half-cycle of an electrical signal from said receiver means, and time circuit means coupled to said amplitude circuit means and operative in response to and in preselected timed relationship to the pulsing of said transmitter means for gating said amplitude circuit means into operative condition for a predetermined time interval substantially equal to a period of one-half cycle of the electrical signal from said receiver means, said time circuit means including means for delaying the beginning of said gating interval until a predetermined time after the emission of an acoustic pulse and during the development by said receiver of a corresponding electrical signal, said predetermined time being dependent upon the velocity of acoustic energy along said casing thereby limiting the output signal to that portion of an electrical signal which occurs at said predetermined time and during said predetermined time interval.

2. Acoustic well logging apparatus for use in a cased well bore comprising: an elongated support member, means coupled to said support member to space said support member a given distance from the walls of a well bore, acoustic transmitter means and acoustic receiver means supported along the length of said support member in a fixed relationship relative to said support member, means for actuating said transmitter means for emitting an acoustic impulse which is transmitted at least in part along the casing in said well bore, said receiver means being responsive to an acoustic impulse transmitted along said casing for developing a corresponding electrical signal characteristically consisting of a series of alternations, amplitude circuit means coupled to said receiver means for developing an output signal with a magnitude proportional to the amplitude of a half-cycle of an electrical signal from said receiver means, time circuit means coupled between said transmitter actuating means and said amplitude circuit means and operative in response to operation of said actuating means and in preselected timed relationship to the pulsing of said transmitter means for gating said amplitude circuit means into operative condition for a predetermined time interval substantially equal to a period of one-half cycle of the electrical signal from said receiver means, said time circuit means including means for delaying the beginning of said gating interval until a predetermined time after the emission of an acoustic pulse and during the development by said receiver of a corresponding electrical signal, said predetermined time being dependent upon the velocity of acoustic energy along said casing to limit the output signal to that portion of an electrical signal which occurs at said predetermined time and during said predetermined time interval, surface located recording means for recording said output signal, and means coupling said amplitude circuit means to said recorder means.

3. Acoustic well logging apparatus for use in a cased well bore comprising: an elongated support member, means coupled to said member to space said support member a given distance from the walls of a well bore, acoustic transmitter means and acoustic receiver means supported along the length of said support member in a fixed relationship relative to said support member, means for actuating said transmitter means for emitting an acoustic impulse which is transmitted at least in part along the casing in said well bore, said receiver means being responsive to an acoustic impulse transmitted along said casing for developing a corresponding electrical signal characteristically consisting of a series of alternations, amplitude circuit means coupled to said receiver means for developing an output signal with a magnitude proportional to the amplitude of a half-cycle of an electrical signal from said receiver means, and time circuit means coupled between said transmitter actuating means and said circuit means and operative in response to the pulsing of said transmitter means for gating said amplitude circuit means into operative condition for a predetermined time interval substantially equal to a period of one-half cycle of the electrical signal from said receiver means, said time circuit means including means for delaying the beginning of said gating interval until a predetermined time after the emission of an acoustic pulse and during the development by said receiver of a corresponding electrical signal, said predetermined time being dependent upon the velocity of acoustic energy along said casing to limit the output signal to that portion of an electrical signal which occurs at said predetermined time and during said predetermined time interval.

4. Acoustic well logging apparatus for use in a cased well bore comprising: an elongated support member, means coupled to said support member to space said support member a given distance from the walls of a well bore, acoustic transmitter means and acoustic receiver means supported along the length of said support member in a fixed relationship relative to said support member, means for actuating said transmitter means for emitting an acoustic impulse which is transmitted at least in part along the casing in said well bore, said receiver means being responsive to an acoustic impulse transmitted along said casing for developing a corresponding electrical signal characteristically consisting of a series of alternations, amplitude circuit means coupled to said receiver means for developing an output signal having a magnitude proportional to the amplitude of a half-cycle of an electrical signal from said receiver means, time circuit means coupled between said transmitter actuating means and said amplitude circuit means and operative in response to the pulsing of said transmitter means for gating said amplitude circuit means into operative condition for a predetermined time interval substantially equal to a period of one-half cycle of the electrical signal from said receiver means, said time circuit means including means for delaying the beginning of said gating interval until a predetermined time after the emission of an acoustic pulse and during the development by said receiver of a corresponding electrical signal, said predetermined time being dependent upon the velocity of acoustic energy along said casing to limit the output signal to that portion of an electrical signal which occurs at said predetermined time and during said predetermined time interval, surface located recording means for recording said output signal, and means coupling said amplitude circuit means to said recorder means.

5. Acoustic well logging apparatus for use in a cased well bore comprising: support means, means for spacing said support means a given distance from the wall of a well bore, acoustic transmitter means and acoustic receiver means mounted in a fixed relationship relative to said support means, means for periodically actuating said transmitter means to provide acoustic impulses, each of which is transmitted at least in part along the casing in said well bore, said receiver means being responsive to an acoustic impulse transmitted along said casing for developing a corresponding electrical signal characteristically consisting of a series of alternations, means for obtaining an indication of the amplitude of only a half-cycle of an electrical signal from said receiver means including amplitude circuit means coupled to said receiver means for deriving a signal representative of the amplitude of a half-cycle of an electrical signal, time circuit means including an input coupled to said actuating means and an output coupled to said amplitude circuit means, said time circuit means rendering said amplitude circuit means operative for a predetermined time interval substantially equal to a period of one-half cycle of the electrical signal from said receiver means, said time circuit means including means for delaying the beginning of the operative interval of said amplitude circuit means until a predetermined time after the emission of an acoustic pulse substantially equal to the sum of the time required for an acoustic impulse to arrive at the receiver after travelling via the casing in the well bore plus the time equal to a period of one-half cycle of the electrical signal, thereby limiting the output signal to that portion of an electrical signal which occurs at said predetermined time and during said predetermined time interval.

6. A method for determining the region of binding of a well pipe in a well bore with the aid of acoustic energy transmitted along the well pipe comprising the steps of, emitting repeated acoustic energy impulses within said pipe at successive first locations therealong and transmitting at least part of the acoustic energy of each impulse along said pipe, detecting the acoustic energy impulses traveling along said pipe and arriving at second locations spaced a fixed distance along said pipe from corresponding ones of said first locations to derive oscillatory electrical signals representing said impulses, selectively measuring the peak amplitude of a single peak of each of said electrical signals occurring at a predetermined time following emission of the corresponding acoustic impulse, said predetermined time being set in accordance with the travel time of said impulses between respective first and second locations via said pipe, and recording indications of said measured peak amplitudes in correlation with the depth of said locations in the well bore, whereby the recorded amplitudes representative of the region of binding will be substantially lower than those representative of a free pipe.

7. Apparatus for determining regions along a cased well bore where tight acoustic coupling between the casing and the surrounding materials is present comprising, an elongated support member adapted to be moved through the well bore while spaced a given distance from the walls thereof, acoustic transmitter means and acoustic receiver means carried by said support member in fixed, spaced-apart relationship, means for actuating said transmitter to emit spaced pulses of acoustic energy as said member moves through the well bore, at least part of the energy of each pulse being transmitted along said casing, said casing providing a path for acoustic signals of a known acoustic velocity, said receiver means being responsive to each pulse of acoustic energy transmitted along said casing to develop a corresponding electrical signal characteristically consisting of a series of alternations, means responsive to operation of said actuation means for generating a gating pulse after each acoustic transmitter pulse beginning at a predetermined fixed time after such transmitter pulse corresponding to the commencement of a preselected half-cycle of said electrical signal and having a duration substantially equal to said half-cycle, said predetermined fixed time being dependent upon the known acoustic velocity in said casing, gating means for receiving said electrical signals and responsive to said gating pulses to pass said preselected half-cycles of said electrical signals, and means coupled to said gating means and responsive to each said half-cycle passed by said gating means for developing an output signal having a magnitude proportional to the amplitude of said half-cycle.

References Cited by the Examiner
UNITED STATES PATENTS

| | | | |
|---|---|---|---|
| 2,396,935 | 3/1946 | Walstrom | 340—18 |
| 2,938,592 | 5/1960 | Charske et al. | 181—.5 |
| 3,050,150 | 8/1962 | Tixier | 181—.5 |
| 3,080,010 | 3/1963 | Blizard | 181—.5 |
| 3,102,251 | 8/1963 | Blizard | 340—18 |
| 3,174,577 | 3/1965 | Holley | 181—.5 |

SAMUEL FEINBERG, *Primary Examiner.*

BENJAMIN A. BORCHELT, *Examiner.*

R. M. SKOLNIK, W. KUJAWA, *Assistant Examiners.*